Aug. 13, 1935.  J. O. BENTLEY  2,011,392
AIRPLANE ALTITUDE INDICATING SYSTEM
Filed Aug. 10, 1928
Fig. 1.  Fig. 2.
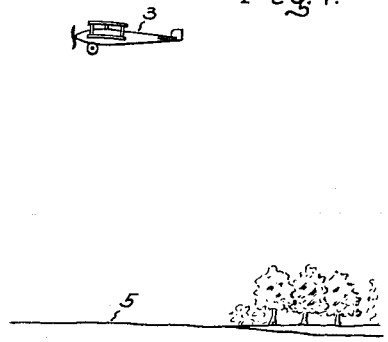
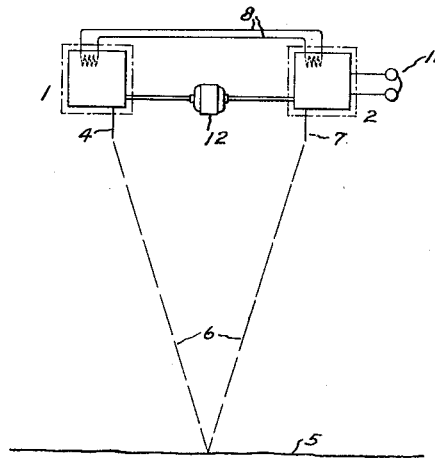
Fig. 3.
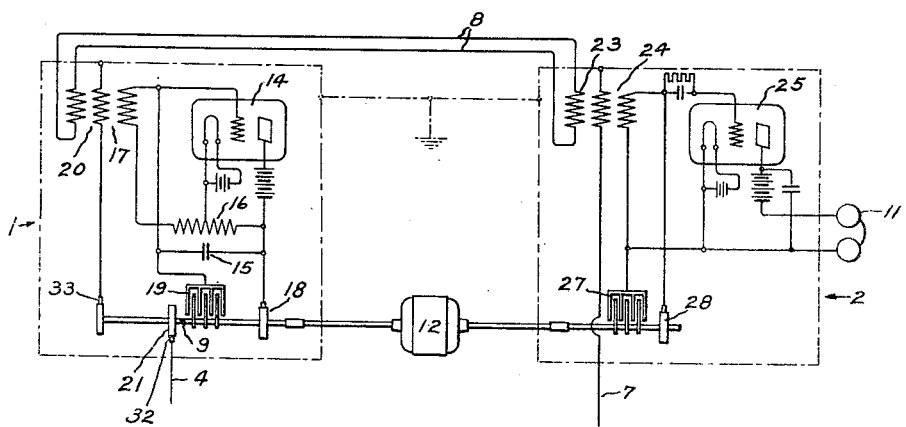
Fig. 4.
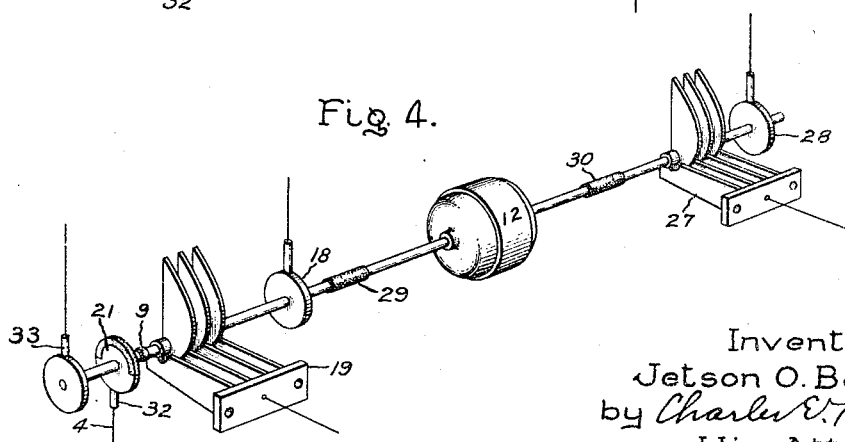
Inventor
Jetson O. Bentley,
by Charles E. Tullar
His Attorney.

Patented Aug. 13, 1935

2,011,392

UNITED STATES PATENT OFFICE 2,011,392

AIRPLANE ALTITUDE INDICATING SYSTEM

Jetson O. Bentley, Castle Point, N. Y., assignor to General Electric Company, a corporation of New York Application August 10, 1928, Serial No. 298,686

22 Claims. (Cl. 250—1)

My invention relates to altitude indicating systems for airplanes and it has for its purpose to provide a novel method and improved means employing radiated electrical waves whereby an indication of the height of the plane above the earth may be had.

In carrying my invention into effect I arrange upon the airplane means for radiating a high frequency wave of preferably linearly varying frequency. As is already well-known, due to the conducting properties of the earth, a portion of this radiated wave which reaches the earth will be reflected back toward the plane. I then provide upon the plane means for receiving the reflected wave and also for receiving a wave from the transmitting, or radiating, means directly. The two received waves, one of which is received directly from the transmitting means and the other of which is received from the transmitting means after having been reflected from the earth will be of different frequency due to the difference in the length of the path over which the two waves travel. This difference is frequency will correspond to the change in frequency of the radiated wave which takes place during the interval required for the wave to traverse the path to the earth and back. That is, at any particular instant, the wave which arrives at the craft from the earth, is of different frequency from the wave simultaneously radiated from the craft, this difference in frequency being due to the change in frequency of the source during the time interval which the wave received at the particular instant required to traverse the distance to the earth and back. Accordingly this difference in frequency will constitute an index of the altitude of the plane above the earth. I therefore, provide upon the plane means for producing a current having a frequency determined by the difference in frequency between the two received waves and utilize this current to operate suitable indicating apparatus whereby the operator may be continuously informed as to the altitude of his plane above the earth.

The novel features of my invention will be set forth with particularity in the appended claims. My invention itself, however, both as to its organization and method of operation together with further objects and advantages thereof, may best be understood by reference to the following description taken in connection with the accompanying drawing in which Fig. 1 represents a plane flying above the earth which is equipped with apparatus provided in accordance with my invention; Figs. 2 and 3 represent schematically means which may be employed and Fig. 4 represents a detail.

Referring to Figs. 1 and 2 of the drawing I have shown at 1 and 2 respectively radio transmitting and receiving equipment which is provided upon the plane 3. The transmitter 1 is adapted to radiate waves by means of a suitable antenna 4 which waves travel downward to the earth 5 and are reflected back in the direction of the plane, the path of their travel being indicated by the line 6. This antenna may comprise a wire suspended or trailing from the plane or if desired may comprise a loop mounted horizontally upon the plane thereby to project the waves downward. The receiver 2 is likewise provided with an antenna 7, of any well-known form, such as that of the transmitting antenna whereby it is caused to respond to the reflected waves. If a loop be employed it may be mounted horizontally in the plane of the transmitting loop thereby reducing the coupling between the two antennæ. The received reflected waves may be amplified, if desired, and heterodyned with a wave which is received from the transmitter 1 directly, as through a circuit 8. By heterodyning the two received waves a current having a frequency equal to the difference between the frequencies of the two received waves is produced. This current may thus be supplied to suitable indicating apparatus 11, which may comprise a head phone or other suitable frequency responsive device, whereby the distance of the plane above the earth may be indicated.

While I have shown a circuit 8 for supplying energy from the transmitter to the receiver it will of course be understood that this is by way of illustration only and that other means may be employed as well. Further this coupling means may, if desired, be omitted altogether, the inherent capacity between the transmitting and receiving circuits including the two antennæ being relied upon for the necessary coupling.

Since the frequency of the waves produced by the transmitter 1 must be varied over a considerable range and since the receiver 2 must respond to waves of this frequency and to waves differing in frequency therefrom by the slight amounts, which depend upon the altitude of the plane above the earth, means are provided in both the transmitter and receiver which are synchronously driven by a suitable means, such as a constant speed motor 12, whereby the frequency characteristic of the frequency determining circuit of the transmitter and the frequency responsive circuit of the receiver are synchronously varied.

Both the transmitter and receiver are suitably shielded from each other by shielding means indicated by the dotted lines shown in the drawing.

Referring to Fig. 3 I have shown in greater detail a circuit embodying my invention. In this figure I have shown in the transmitter 1 a suitable electron discharge device 14 which is connected to produce oscillations of short wave length. Between the anode and grid of this oscillation generator is connected the usual oscillatory circuit comprising capacity 15 and inductance 16, a portion of which is included in the primary winding of transformer 17. Connected in shunt with the oscillatory circuit 15, 16 through a slip ring 18 which is mounted upon the shaft of the motor 12 is a linear frequency condenser 19, the rotor of which is driven by the motor 12. By this means the frequency of the oscillations produced by the generator 14 are caused cyclically to vary, first to increase and then to decrease between limits determined by the constants of the oscillatory circuit and the characteristics of the condenser.

These oscillations are supplied to the antenna 4, through a winding 20 on the transformer 17 and a suitable commutator 21 which is driven by the motor 12. This commutator is insulated from the rotor of condenser 21 by suitable means shown at 9. A portion of the oscillations which are produced are supplied through a circuit 8 to the receiver, where they are impressed upon the primary winding 23 of a transformer 24. It may in practice, be found that the natural coupling between antennæ 4 and 7 is sufficient coupling between the transmitter and receiver in which case the circuit 8 may be omitted. Also impressed upon this transformer 24 from the antenna 7 are waves reflected from the earth, these waves being received from antenna 7 which may be arranged in any manner well-known in the art, as for instance being suspended from the plane. Connected to the secondary winding of the transformer 24 is a suitable rectifying device comprising an electron discharge device 25, which is connected in the manner commonly employed in connection with radio detectors. The secondary winding of the transformer 24 is tuned to the frequency of the received waves by means of the linear frequency condenser 27 which is connected in shunt therewith by means of a slip ring 28. The rotor of the linear frequency condenser 27 is driven by the shaft of the constant speed motor 12 and is so adjusted with respect to the stator, and with respect to the rotor of condenser 19, that the frequency to which the receiver is adapted to respond is equal to and varies synchronously with the frequency of the transmitted waves produced by the oscillation generator 14.

Figure 4 represents in greater detail the structure of the means for varying the frequency of the oscillation generator and of the frequency responsive circuit of the receiver. It will be seen that the condensers 19 and 27 are of the well-known linear frequency type having their rotors mounted upon the shaft of the motor 12 and suitably insulated from the motor 12 and those parts of the plane which are in engagement therewith by insulating members 29 and 30.

The commutator 21, through which the transmitter is intermittently connected to the radiating antenna 4, comprises a disk having a conducting segment and a non-conducting segment upon which rides a brush 32, this brush being connected to the antenna and the conducting segment of the disk being connected by a suitable slip ring and brush 33 to the circuit of the transmitter.

In the operation of my invention as thus arranged high frequency oscillations are produced and are supplied to the antenna 4. The supply of high frequency oscillations to the antenna 4 is periodically interrupted by the commutator 21. This commutator is so positioned with respect to the rotor of the linear frequency condenser 19 that high frequency impulses are radiated, each impulse being of linearly varying frequency. Thus when the maximum frequency, for example, is reached the supply of current to the antenna is interrupted and is so maintained until the rotor 19 has reached a point where currents of the minimum frequency are produced, after which current will again be supplied to the antenna. The reflected waves are received upon the antenna 7 and are supplied to the electron discharge device 25 and similarly waves from the transmitter 1 are supplied directly through the circuit 8 to the electron discharge device 25. During each impulse a current will appear in the output circuit of the detector having an audible frequency which is dependent upon the altitude of the plane above the earth.

While the average wave length which is employed, the range over which the frequency will be varied, and the rate of change of frequency may be varied under different circumstances, it is preferable that these values be so adjusted that as a minimum two or three cycles of the beat frequency be produced in the output of the detector 25, during each impulse of the received reflected wave. If the system is to be used only while the plane is flying at the higher altitudes these results may be had, if a wave length of about twenty meters be employed and the variation in frequency being in a ratio of about two to one. Where the system is used for landing purposes as in case of fog or other cases of poor visibility considerably shorter wave lengths should be employed.

I have, in the above explanation of the operation of my device referred to but a single theory to explain the results which may be obtained. A number of theoretical explanations, however, may be advanced for the operation of my device. For example, let us assume an oscillator on the craft radiating oscillations having a certain frequency toward the earth and producing a reflected wave which arrives back at the craft. This reflected wave combines with the radiated wave in a certain phase relation dependent upon the altitude of the craft thereby causing the radiated oscillations to have a certain amplitude. If the frequency of the radiated oscillations now be shifted slightly then the reflected wave combines with the radiated wave in a different phase relation dependent upon the altitude of the craft above the earth thereby causing the radiated wave to have a correspondingly different amplitude. To carry the same process further, assume that the frequency is varied linearly continuously. The phase relation between the radiated wave and reflected wave then varies cyclically with the result that the amplitude varies cyclically at a frequency dependent upon the altitude of the craft above the earth. Accordingly, if the oscillations of the oscillator be detected in any desired way, as by coupling a detector thereto, an alternating current will be produced having a frequency which varies with the altitude of the craft above the earth.

This equipment is the exact equipment above described and produces the same results. The reflected wave is unavoidably received upon both of the antennæ 4 and 7 and since both are coupled to the oscillator they act as a single antenna to control the amplitude of the oscillations produced. The amplitude variations are then detected by detector 25.

Still another visualization of the phenomenon which occurs in the operation of my system may be had by considering the wave produced by source 14 at any particular instant. This wave may be considered to combine with the reflected wave to produce a standing wave pattern in space between the earth and the craft. This pattern contains a number of nodes and loops, or cycles, dependent upon the instant frequency of the oscillations and the altitude of the craft above the earth. At a different instant when the frequency is higher, the altitude remaining the same, this pattern, of course, contains a greater number of nodes and loops. Thus as the frequency is increased by the rotating condenser an increased number of nodes and loops is compressed into the pattern in space between the craft and the earth. These additional nodes and loops may be considered as a wave passing sawlike across the antenna of the craft and setting up therein a corresponding amplitude variation having a corresponding number of nodes and loops. The detector 25 detects these amplitude variations and produces a current having the corresponding frequency.

The utility of my device at high altitudes is more readily apparent from this latter explanation of its operation. At high altitudes the standing wave pattern in space between the earth and the craft contains a proportionately greater number of nodes and loops than it contains when the craft is at low altitudes at any particular frequency of the radiated wave. Accordingly, at high altitudes for any given change in frequency of the source a proportionately greater number of nodes and loops are compressed into, or expelled from the pattern, with the result that a greater number of nodes and loops pass the antenna of the craft thereby setting up correspondingly higher frequencies in the detecting equipment than occurs at lower altitudes. Thus a greater number of cycles of the low frequency current are produced in the headphones, or other indicating equipment, during each rotation of the condenser.

It will thus be seen that I do not wish to be limited by any particular theory of operation of my device. While these and other theoretical explanations may be made all of these theories are simply different ways of expressing in words the phenomenon which occurs in the operation of the equipment disclosed. I particularly contemplate to cover by the present application the method and means for utilizing those variations which are produced by combining a wave of varying frequency radiated from the craft with the reflected wave produced thereby to determine the altitude of the craft above the earth.

While the circuits shown in the drawing represent an embodiment whereby the invention may be carried out it will be understood that they are presented entirely for illustration purposes and that I do not wish to be limited thereto since many modifications may be made both in the circuit arrangement and in the instrumentalities employed without departing from the spirit and scope of my invention as set forth in the appended claims.

What I claim as new and desire to secure by Letters Patent of the United States, is:

1. The method of indicating the height of an airplane above the earth, consisting in producing a high radio frequency electromagnetic wave of varying wave length upon the plane, radiating said wave toward the earth so that it is reflected upward by the earth, producing a current on the plane having the beat frequency between the wave which is reflected from the earth and the wave which is radiated from the plane and utilizing at any altitude to be measured the current of beat frequency to indicate the height of the plane above the earth.

2. An airplane altitude indicating system comprising means for radiating a high frequency electromagnetic wave of varying wave length from the plane such that said wave is reflected upward from the earth and means on the plane for producing a current having the difference frequency between a current having the frequency of the instant wave which is radiated by said means and the wave which is reflected from the earth and means responsive to said current of difference frequency for indicating the height of the plane above the earth.

3. An airplane altitude indicating system, comprising means for radiating high frequency electromagnetic impulses of short wave length from the plane, the wave of each impulse being of changing frequency, means on the plane for receiving said impulses directly from said means and also for receiving said impulses as reflected from the earth, means for producing current having a frequency determined by the difference between the waves of the received impulses and means responsive to said current for indicating the height of the plane above the earth.

4. The combination, in an airplane altitude indicating system, means on the plane for radiating high frequency electromagnetic impulses of short wave length from the plane toward the earth, each impulse being of linearly varying frequency, a receiver connected to respond to waves which are radiated by said means and reflected from the earth, a coupling means for supplying energy from said means directly to the receiver, said receiver being arranged to produce current having a frequency equal to the difference between the frequencies of the reflected wave and the wave supplied by the coupling means and indicating means responsive to said current of difference frequency.

5. The combination, in an airplane altitude indicating system, a radio transmitting system mounted on the plane having a frequency determining circuit, a radio receiving system mounted on the plane having a frequency responsive circuit, said receiver being arranged to receive energy directly from the transmitter and to receive energy from the transmitter after being reflected from the earth, means for synchronously and linearly varying the frequency characteristics of said frequency determining and frequency responsive circuits, and means in the receiver responsive to the difference in frequency between the two received waves for indicating the altitude of the plane above the earth.

6. The combination, in an airplane altitude indicating system, a radio transmitter and receiver mounted on the plane, means for supplying energy from the transmitter to the receiver directly and from the transmitter to the receiver after being reflected from the earth, means for varying the frequency of the transmitted waves between limits of minimum and maximum wavelength, and for synchronously adjusting the receiver to respond to said waves, means for interrupting the transmitted waves when one of said limits is reached and for maintaining the interruption until waves of the other limit are produced and means in the receiver responsive to the difference in frequency between the received waves to indicate the altitude of the plane above the earth.

7. The combination, in an airplane altitude indicating system, a radio transmitting system mounted on the plane having a frequency determining circuit, a radio receiving system mounted on the plane having a frequency responsive circuit, each of said circuits including a linear frequency variable condenser connected to control the frequency characteristic of the circuit and each of said condensers having a rotor, means for synchronously rotating said rotors to synchronously vary the characteristic of said circuits and thereby to cause the receiver to respond to waves produced by the transmitter, means for interrupting the operation of the transmitter during a portion of each rotation of the rotors, and means in the receiver responsive to the difference in frequency between waves received from the transmitter directly and waves received from the transmitter after being reflected from the earth to indicate the altitude of the plane above the earth.

8. An airplane altitude indicating system comprising means for radiating a high frequency electromagnetic wave of varying wave length from the plane and for receiving said wave on the plane after it has been reflected from the earth, means responsive to the reflected wave received upon the craft and the instant wave radiated from the craft for producing current having a frequency which is dependent upon the time interval required for said wave to travel to the earth and back and indicating means responsive to said current.

9. The method of determining altitude of an aircraft above the earth which includes radiating an electric wave from the craft toward the earth, continuously varying the frequency of said wave over a certain range, combining the radiated wave and the reflected wave and demodulating the resulting wave.

10. The method of determining altitude from a craft above the earth which includes radiating a high frequency radio wave from the craft toward the earth, whereby said wave produces a number of nodes and loops in space between the craft and the earth, the number of said nodes and loops being dependent upon the height of the craft above the earth and the frequency of the radiated wave, and changing the number of said nodes and loops between the craft and the earth while substantially maintaining the instant altitude of the craft thereby to determine the altitude of the craft above the earth.

11. The method of determining altitude from a craft above the earth which includes radiating a high frequency radio wave from the craft toward the earth, whereby said wave produces a number of nodes and loops in space between the craft and the earth, the number of said nodes and loops being dependent upon the height of the craft above the earth and the frequency of the radiated wave, changing the frequency of said wave and observing the change in the number of said nodes and loops produced by said change in frequency.

12. The method of determining the height of aircraft above the earth, which includes radiating a wave from the craft toward the earth, thereby forming in the space between the craft and the earth a standing wave pattern having a number of cycles, continuously changing the frequency of said wave by a predetermined amount, said amount being such that said number of cycles is changed by a plurality of cycles dependent in number upon the height of the craft above the earth, and detecting the number of cycles change in said pattern during said predetermined change in frequency.

13. The combination, in an altimeter for aircraft, of a source of oscillations of short wave length, means to radiate said oscillations from the craft toward the earth, and to receive said oscillations after reflection from the earth, means successively to change the frequency of said oscillations over a predetermined range, thereby to produce cyclical variations in amplitude of said oscillations, and means to indicate the number of said cyclical variations during each change in frequency over said predetermined range.

14. The combination, in an altimeter for aircraft, of an electron discharge generator of oscillations of short wave length, an antenna coupled to said generator and arranged to radiate oscillations generated thereby toward the earth and to receive said oscillations after reflection from the earth, a rotatable frequency controlling member for said generator, arranged to vary the frequency thereof over a predetermined range, a motor for rotating said frequency controlling member, whereby the frequency of said generator is successively varied over said range, said range being of such width that a plurality of cycles of amplitude variation occur at the altitudes to be determined during each change in frequency over said range.

15. A system for automatically indicating the distance between an aircraft and the earth's surface, comprising means on the aircraft for transmitting radio frequency electromagnetic waves the frequency of which as transmitted is continuously varying, means also on said aircraft for receiving radio frequency electromagnetic waves reflected by the earth, said latter means including means whereby the received waves are combined with the transmitted waves, and means responsive to the combined effect of the transmitted and reflected electromagnetic waves to give a continual indication of the changing phase difference between those waves.

16. A system for automatically indicating the distance between two bodies, comprising means on one body for transmitting radio frequency electromagnetic waves the frequency of which as transmitted is continuously varying, means also on the first body for receiving radio frequency electromagnetic waves reflected by the other body, said latter means including means whereby the received waves are combined with the transmitted waves, and means responsive to the combined effect of the transmitted and reflected waves to give a continual indication dependent upon the rate of change of phase difference between those waves.

17. A system for automatically indicating the distance between two bodies, comprising means on one body for transmitting radio frequency electromagnetic waves, the frequency of which is continuously varying, and for receiving said radio frequency electromagnetic waves after reflection by the other body, said means including means whereby the received waves are combined with the transmitted waves, and means responsive to the combined effect of the transmitted and reflected waves to give a continual indication of the changing phase difference between those waves.

18. The method of determining the altitude of an aircraft above the earth which consists in generating high frequency electromagnetic waves, whose frequency changes continuously through a given range at a known rate of change, transmitting the said waves, and receiving the said waves after being reflected from the earth, beating the received waves together with a portion of the generated waves and noting the number of beats per unit of time resulting from the beating operation.

19. A system for determining the altitude of an aircraft above the earth comprising, in combination, a source of electromagnetic waves, means to radiate the said waves from the aircraft, means to pick up the waves as reflected from the earth's surface and to combine them with oscillations produced by said source to produce a current having a beat frequency between the radiated and received oscillations, and a frequency indicator responsive to the wave representing the current resulting from the beating operation.

20. An airplane altitude indicating device, comprising an electron discharge oscillation generator adapted to produce electric oscillations of short wave length, an antenna coupled to said oscillator and arranged to radiate electric oscillations of short wave length toward the earth whereby they are reflected by the earth and arrive back at the craft, a condenser connected in circuit with said oscillator and arranged to control the frequency thereof, means continuously to rotate said condenser thereby successively to vary the frequency of the radiated oscillations over a predetermined range whereby the phase difference between the radiated and reflected waves cyclically varies, means on the craft to combine the radiated and reflected waves to produce a current varying cyclically in amplitude dependent on said phase difference, and a frequency responsive indicating device connected to respond to said current.

21. An airplane altitude indicating device, comprising an electron discharge oscillation generator adapted to produce electric oscillations of short wave length, an antenna coupled to said oscillator and arranged to radiate electric oscillations of short wave length toward the earth whereby they are reflected by the earth and arrive back at the craft, a condenser connected in circuit with said oscillator and arranged to control the frequency thereof, means continuously to rotate said condenser thereby successively to vary the frequency of radiated oscillations over a predetermined range, means on the craft to combine the radiated and received reflected wave to produce a current having the beat frequency, the rate of rotation of said condenser and range of variation of frequency being such that at least two cycles of said beat note are produced during each rotation of the condenser when the craft is in a range of altitudes to be indicated, and an indicating device responsive to said current having the beat frequency.

22. An airplane altitude indicating device, comprising an electron discharge oscillation generator adapted to produce electric oscillations of short wave length, an antenna coupled to said oscillator and arranged to radiate electric oscillations of short wave length toward the earth whereby they are reflected by the earth and arrive back at the craft, a demodulator on the craft, an antenna coupled thereto arranged to receive oscillations from said first antenna both directly and after reflection from the earth, whereby said demodulator produces a current dependent upon the relation between the radiated and received waves, a condenser connected in circuit with said oscillator and arranged to vary the frequency thereof continuously over a predetermined range, whereby the wave received on said second antenna is of different frequency from that received directly from said first antenna, means to rotate said condenser continuously and a frequency responsive indicating device connected to respond to the current produced in said demodulator.

JETSON O. BENTLEY.